US008512147B2

(12) United States Patent
Aoki et al.

(10) Patent No.: US 8,512,147 B2

(45) Date of Patent: Aug. 20, 2013

(54) WAGERING GAME WITH SHARED PAYOFF BASED ON MULTIPLE PLAYER SELECTIONS

(75) Inventors: Dion K. Aoki, Henderson, NV (US); Jason C. Gilmore, Scottsdale, AZ (US); Thomas M. Kopera, Villa Park, IL (US); Christy Juinsuk Olson, Henderson, NV (US)

(73) Assignee: WMS Gaming Inc., Waukegan, IL (US)

( * ) Notice: Subject to any disclaimer, the term of this patent is extended or adjusted under 35 U.S.C. 154(b) by 149 days.

(21) Appl. No.: 12/850,388

(22) Filed: Aug. 4, 2010

(65) Prior Publication Data

US 2011/0053683 A1 Mar. 3, 2011

Related U.S. Application Data

(63) Continuation of application No. 11/238,219, filed on Sep. 29, 2005, now Pat. No. 7,775,873.

(60) Provisional application No. 60/614,566, filed on Sep. 30, 2004.

(51) Int. Cl.
*A63F 13/00* (2006.01)

(52) U.S. Cl.
USPC ........ 463/42; 463/9; 463/16; 463/17; 463/18; 463/20; 463/25; 463/29; 463/37; 463/39; 463/40

(58) Field of Classification Search
USPC .............. 463/9, 10, 16–20, 25, 29, 37, 39–43
See application file for complete search history.

(56) References Cited

U.S. PATENT DOCUMENTS

| | | | | |
|---|---|---|---|---|
| 4,624,459 | A | 11/1986 | Kaufman | 273/143 R |
| 4,837,728 | A | 6/1989 | Barrie et al. | 364/412 |
| 4,948,134 | A | 8/1990 | Suttle et al. | 273/85 |
| 5,116,055 | A | 5/1992 | Tracy | 273/138 A |
| 5,249,800 | A | 10/1993 | Hilgendorf et al. | 273/138 A |
| 5,275,400 | A | 1/1994 | Weingardt et al. | 273/85 |

(Continued)

FOREIGN PATENT DOCUMENTS

| | | | |
|---|---|---|---|
| CA | 2334546 | A1 | 8/2001 |
| DE | 195 15 983 | A1 | 11/1996 |

(Continued)

OTHER PUBLICATIONS

Pyramid Scheme Http://en.wikipedia.org/wiki/pyramid_scheme, 1 page, dated prior to Feb. 2012.

(Continued)

*Primary Examiner* — Sunit Pandya

(74) *Attorney, Agent, or Firm* — Nixon Peabody LLP

(57) ABSTRACT

The present invention is directed to a gaming terminal and a method of playing a wagering game at a gaming terminal whereby multiple players make selections and accumulate bonus awards as the game is passed from one player to another. Play continues until a game-terminating object is selected. At that time, each player that participated in the wagering game receives his or her accumulated awards plus any awards won by subsequent players.

17 Claims, 8 Drawing Sheets

(56) References Cited

U.S. PATENT DOCUMENTS

| | | | | |
|---|---|---|---|---|
| 5,280,909 | A | 1/1994 | Tracy | 273/138 A |
| 5,344,144 | A | 9/1994 | Canon | 273/138 A |
| 5,377,973 | A | 1/1995 | Jones et al. | 273/85 CP |
| 5,393,057 | A | 2/1995 | Marnell, II | 273/85 CP |
| 5,524,888 | A | 6/1996 | Heidel | 463/22 |
| 5,544,892 | A | 8/1996 | Breeding | 273/292 |
| 5,564,700 | A | 10/1996 | Celona | 463/27 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,645,486 | A | 7/1997 | Nagao et al. | 463/27 |
| 5,655,961 | A | 8/1997 | Acres et al. | 463/27 |
| 5,766,076 | A | 6/1998 | Pease et al. | 463/27 |
| RE35,864 | E | 7/1998 | Weingardt | 463/28 |
| 5,779,549 | A | 7/1998 | Walker et al. | 463/42 |
| 5,816,918 | A | 10/1998 | Kelly et al. | 463/16 |
| 5,823,874 | A | 10/1998 | Adams | 463/17 |
| 5,830,063 | A | 11/1998 | Byrne | 463/18 |
| 5,848,932 | A | 12/1998 | Adams | 463/20 |
| 5,855,515 | A | 1/1999 | Pease et al. | 463/27 |
| 5,876,284 | A | 3/1999 | Acres et al. | 463/25 |
| 5,885,158 | A | 3/1999 | Torango et al. | 463/27 |
| 5,899,456 | A | 5/1999 | Weinstock et al. | 273/243 |
| 5,941,773 | A | 8/1999 | Harlick | 463/26 |
| 5,975,528 | A | 11/1999 | Halaby | 273/148 |
| 6,007,427 | A | 12/1999 | Wiener et al. | 463/17 |
| 6,012,982 | A | 1/2000 | Piechowiak et al. | 463/16 |
| 6,039,648 | A | 3/2000 | Guinn et al. | 463/16 |
| 6,047,963 | A | 4/2000 | Pierce et al. | 273/121 B |
| 6,068,553 | A | 5/2000 | Parker | 463/27 |
| 6,077,162 | A | 6/2000 | Weiss | 463/26 |
| 6,089,977 | A | 7/2000 | Bennett | 463/20 |
| 6,089,980 | A | 7/2000 | Gauselmann | 463/27 |
| 6,102,474 | A | 8/2000 | Daley | 296/836 |
| 6,102,798 | A | 8/2000 | Bennett | 463/16 |
| 6,102,799 | A | 8/2000 | Stupak | 463/27 |
| 6,110,043 | A | 8/2000 | Olsen | 463/27 |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,168,521 | B1 | 1/2001 | Luciano et al. | 436/18 |
| 6,168,523 | B1 | 1/2001 | Piechowiak et al. | 463/26 |
| 6,203,010 | B1 | 3/2001 | Jorasch et al. | 273/138.1 |
| 6,206,374 | B1 | 3/2001 | Jones | 273/292 |
| 6,206,782 | B1 | 3/2001 | Walker et al. | 463/25 |
| 6,210,275 | B1 | 4/2001 | Olsen | 463/16 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,482 | B1 | 5/2001 | Bennett | 463/27 |
| 6,224,484 | B1 | 5/2001 | Okuda et al. | 463/27 |
| 6,231,445 | B1 | 5/2001 | Acres | 463/42 |
| 6,254,483 | B1 | 7/2001 | Acres | 463/26 |
| 6,312,232 | B1 | 11/2001 | Mori et al. | 417/297 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,336,859 | B2 | 1/2002 | Jones et al. | 463/13 |
| 6,336,862 | B1 | 1/2002 | Byrne | 463/27 |
| 6,345,824 | B1 | 2/2002 | Selitzky | 273/292 |
| 6,358,149 | B1 | 3/2002 | Schneider et al. | 463/27 |
| 6,361,441 | B1 | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,416,408 | B2 | 7/2002 | Tracy et al. | 463/16 |
| 6,416,409 | B1 | 7/2002 | Jordan | 463/27 |
| 6,422,940 | B1 | 7/2002 | Walker et al. | 463/13 |
| 6,431,983 | B2 | 8/2002 | Acres | 463/25 |
| 6,435,968 | B1 | 8/2002 | Torango | 463/27 |
| 6,439,995 | B1 | 8/2002 | Hughs-Baird et al. | 463/20 |
| 6,454,266 | B1 | 9/2002 | Breeding et al. | |
| 6,471,207 | B1 | 10/2002 | Schlaifer | 273/138.1 |
| 6,482,089 | B2 | 11/2002 | DeMar et al. | 463/20 |
| 6,506,117 | B2 | 1/2003 | DeMar et al. | 463/20 |
| 6,508,707 | B2 | 1/2003 | DeMar et al. | 463/16 |
| 6,517,433 | B2 | 2/2003 | Loose et al. | 463/20 |
| 6,520,855 | B2 | 2/2003 | DeMar et al. | 463/20 |
| 6,589,115 | B2 | 7/2003 | Walker et al. | 463/25 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,193 | B2 | 7/2003 | Baerlocher et al. | 463/27 |
| 6,609,973 | B1 | 8/2003 | Weiss | 463/20 |
| 6,648,753 | B1 | 11/2003 | Tracy et al. | 463/16 |
| 6,648,762 | B2 | 11/2003 | Walker et al. | 463/25 |
| 6,685,560 | B1 | 2/2004 | Hughes | 463/16 |
| 6,692,354 | B2 | 2/2004 | Tracy et al. | 463/16 |
| 6,712,695 | B2 | 3/2004 | Mothwurf et al. | 463/25 |
| 6,712,699 | B2 | 3/2004 | Walker et al. | 463/30 |
| 6,733,390 | B2 | 5/2004 | Walker et al. | 463/23 |
| 6,790,141 | B2 | 9/2004 | Muir | 463/42 |
| 6,837,793 | B2 | 1/2005 | McClintic | 463/42 |
| 6,869,361 | B2 | 3/2005 | Sharpless et al. | 463/25 |
| 6,887,159 | B2 | 5/2005 | Leen et al. | 463/42 |
| 8,025,569 | B2 | 9/2011 | Nguyen et al. | 463/30 |
| 8,118,657 | B2 | 2/2012 | Marks et al. | 463/16 |
| 8,235,782 | B2 | 8/2012 | Walker et al. | 463/13 |
| 2001/0036857 | A1 | 11/2001 | Mothwurf et al. | |
| 2002/0055381 | A1 | 5/2002 | Tarantino | |
| 2002/0107062 | A1 | 8/2002 | Wong | |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2003/0027618 | A1 | 2/2003 | Byrne | 463/16 |
| 2003/0036430 | A1 | 2/2003 | Cannon | 463/42 |
| 2003/0045337 | A1 | 3/2003 | Byrne | 463/16 |
| 2003/0047874 | A1 | 3/2003 | Leen | 273/292 |
| 2003/0050106 | A1 | 3/2003 | Lyfoung | 463/13 |
| 2003/0064776 | A1 | 4/2003 | Byrne | 463/16 |
| 2003/0064807 | A1 | 4/2003 | Walker et al. | 463/42 |
| 2003/0100361 | A1 | 5/2003 | Sharpless et al. | |
| 2003/0114218 | A1 | 6/2003 | McClintic | 463/25 |
| 2003/0119576 | A1 | 6/2003 | McClintic | 463/20 |
| 2003/0148808 | A1 | 8/2003 | Price | 463/27 |
| 2003/0181231 | A1 | 9/2003 | Vancura et al. | 463/9 |
| 2003/0186733 | A1 | 10/2003 | Wolf et al. | 463/16 |
| 2003/0216166 | A1 | 11/2003 | Baerlocher et al. | 463/20 |
| 2003/0222402 | A1 | 12/2003 | Olive | 273/292 |
| 2003/0224852 | A1 | 12/2003 | Walker et al. | 463/20 |
| 2003/0228899 | A1 | 12/2003 | Evans | 463/25 |
| 2003/0236116 | A1 | 12/2003 | Marks et al. | 463/16 |
| 2004/0002377 | A1 | 1/2004 | Staw et al. | |
| 2004/0009808 | A1 | 1/2004 | Gauselmann | 463/25 |
| 2004/0009811 | A1 | 1/2004 | Torango | 463/25 |
| 2004/0038741 | A1 | 2/2004 | Gauselmann | 463/42 |
| 2004/0048644 | A1 | 3/2004 | Gerrard et al. | 463/16 |
| 2004/0087368 | A1 | 5/2004 | Gauselmann | 463/42 |
| 2004/0106448 | A1 | 6/2004 | Gauselmann | 463/25 |
| 2004/0121838 | A1* | 6/2004 | Hughs-Baird et al. | 463/25 |
| 2004/0132524 | A1 | 7/2004 | Ramstad et al. | 463/16 |
| 2004/0204226 | A1 | 10/2004 | Foster et al. | 463/20 |
| 2004/0204235 | A1 | 10/2004 | Walker et al. | 463/29 |
| 2004/0235552 | A1 | 11/2004 | Gauselmann | 463/16 |
| 2004/0242297 | A1 | 12/2004 | Walker et al. | 463/13 |
| 2004/0242303 | A1 | 12/2004 | Walker et al. | 463/16 |
| 2004/0242306 | A1 | 12/2004 | Tarantino | |
| 2005/0014554 | A1 | 1/2005 | Walker et al. | 463/20 |
| 2005/0026674 | A1 | 2/2005 | Wolf et al. | 463/16 |
| 2005/0148382 | A1 | 7/2005 | Fox | 463/19 |
| 2005/0187008 | A1 | 8/2005 | Nakajima | 463/20 |
| 2005/0192073 | A1 | 9/2005 | Nakajima | 463/16 |
| 2005/0282608 | A1* | 12/2005 | O'Halloran | 463/16 |
| 2005/0282618 | A1 | 12/2005 | O'Halloran | 463/20 |
| 2005/0282628 | A1 | 12/2005 | Beatty et al. | 463/27 |
| 2006/0068893 | A1 | 3/2006 | Jaffe et al. | |

FOREIGN PATENT DOCUMENTS

| | | | |
|---|---|---|---|
| DE | 196 24 321 | A1 | 1/1998 |
| EP | 0 521 599 | A1 | 1/1993 |

| | | | |
|---|---|---|---|
| GB | 2 153 572 | A | 8/1985 |
| GB | 2 181 589 | A | 4/1987 |
| GB | 2 242 300 | A | 9/1991 |
| GB | 2 313 792 | A | 10/1997 |
| GB | 2 333 880 | | 8/1999 |
| WO | WO 99/03078 | A1 | 1/1999 |
| WO | WO 99/19037 | A1 | 4/1999 |
| WO | WO 01/33478 | A1 | 5/2001 |
| WO | WO 03/026754 | A1 | 4/2003 |
| WO | WO 03/083789 | A1 | 10/2003 |
| WO | WO 2005/029429 | A1 | 3/2005 |

OTHER PUBLICATIONS

Article for "Easy Riches" by Sigma Game, Strictly Slots, 1 page (Aug. 2001).
Article for "Millioniser" by Glenn Haussman, Strictly Slots, pp. 50-53 (Mar. 2004).
Product Sheet for "Big Games Safari," IGT, 24 pages (2000).
"New '97 Games," International Gaming & Wagering Business, 24 pages (Mar. 1997).

* cited by examiner

*Fig.12*
PLAYER 1
PASS THE BUCK
5
PASS THE BUCK
THE BUCK STOPS HERE
25
100
50
PASS THE BUCK
THE BUCK STOPS HERE!
702
CREDITS
5
BONUS BET
180
BONUS WON
40
62
26
64
66
44
60
54
42
48
46

WAGERING GAME WITH SHARED PAYOFF BASED ON MULTIPLE PLAYER SELECTIONS

CROSS-REFERENCE TO RELATED APPLICATIONS

This application is a continuation of and claims priority to U.S. application Ser. No. 11/238,219, filed Sep. 29, 2005, due to issue as U.S. Pat. No. 7,775,873 and further claims priority to U.S. Provisional Application No. 60/614,566, filed Sep. 30, 2004, each of which is incorporated herein by reference in its entirety.

FIELD OF THE INVENTION

The present invention relates generally to gaming terminals and methods of playing wagering games at the gaming terminals and, more particularly, to a gaming terminal and method of playing a wagering game at the gaming terminal whereby players receive awards based on multiple player selections at different gaming terminals.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves collecting coin-in data from participating gaming device(s) (e.g., slot machines), contributing a percentage of that coin-in data to a jackpot amount, and awarding that jackpot amount to a player upon the occurrence of a certain jackpot-won event. The percentage of the coin-in is determined prior to any result being achieved and is independent of any result. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

In some basic games, bonus games, and progressive games, players are allowed to make selections that influence the progression of the game and/or the award that they receive when game play is over. This has the benefit of allowing a player to feel like they have some control over the outcome of the game, or at least the final award. Selections are usually made by a single player at a single gaming terminal. A further enhancement of these games would allow not only a single player to make selections, but would allow multiple players to make selections in the same game. This would result in a shared gaming experience with several players at different gaming terminals making selections and influencing the outcome of a game and/or the final award.

Thus, the present invention provides further enhancement of the gaming experience by allowing multiple players to participate in a wagering game. More specifically, multiple players are allowed to make selections during a wagering game that has the effect of increasing a final bonus award. This provides increased anticipation of future winnings and a sense of group achievement based on the collaborative effort of multiple players.

SUMMARY OF THE INVENTION

According to one embodiment of the present invention, the needs mentioned above are met by a gaming terminal having a basic game and a bonus game. The basic game has a plurality of symbols that indicate a randomly selected outcome that has been selected from a plurality of outcomes in response to a wager input by a player. The bonus game has a plurality of selectable objects. The selectable objects are associated with game-passing objects, game-terminating objects and bonus awards that are displayed upon selection. Upon selection of a player-selectable object at a first gaming terminal that is a game-passing object, the bonus game is passed to a second gaming terminal, and thereafter a player at the second gaming terminal continues selection of the selectable objects.

According to another embodiment of the invention, a method of playing a wagering game is disclosed. The method includes providing a basic game and a bonus game at a first gaming terminal and a second gaming terminal. The basic game has a plurality of symbols that indicate a randomly selected outcome that has been selected from a plurality of outcomes in response to a wager input by a player. The bonus game includes player-selectable objects. The player-selectable objects are associated with game-passing objects, game-terminating objects, and bonus awards that are displayed upon selection. The method includes receiving a selection of at least one of the player-selectable objects at the first gaming terminal. In response to a selection of a game-passing object at the first gaming terminal, the bonus game is passed to the second gaming terminal. The second gaming terminal receives a selection of at least one of the player-selectable objects until a game-passing object or game-terminating object is selected. Finally, the player at the second gaming terminal is awarded the amount of the bonus awards from selections at the second gaming terminal. The player at the first gaming terminal is awarded the amount of the bonus awards from selections at the first and second gaming terminals.

According to another embodiment of the invention, a gaming system includes a plurality of gaming terminals. The gaming terminals include a wagering game having player-selectable objects. The gaming system also includes a controller that operates to receive a selection of at least one of the player-selectable objects at a first gaming terminal. The controller terminates selections at the first gaming terminal and passes the wagering game to a second gaming terminal. The controller then receives a selection of at least one of the player-selectable objects at the second gaming terminal. Finally, the controller terminates selections at the second gaming terminal, and awards a player at the first gaming terminal with an award associated with the player-selectable objects selected at the first and second gaming terminals.

According to another embodiment of the invention, a gaming system includes a first gaming terminal for playing a wagering game in response to wager inputs. The wagering game has player-selectable elements that reveal game-passing objects and bonus award selectable elements that include an award. The gaming system includes a second gaming terminal for playing a wagering game in response to wager inputs. In response to a player at the first gaming terminal selecting an element associated with a game-passing object, a player at the second gaming terminal continues playing the wagering game that was initiated at the first gaming terminal by selecting at least one of the player-selectable elements.

According to another embodiment of the invention, a method of playing a wagering game is disclosed. The method includes providing a first gaming terminal for playing a wagering game. The wagering game includes player-selectable objects which are associated with game-passing objects, game-terminating objects, and bonus awards that are revealed upon selection. The method includes receiving a selection of at least one of the player-selectable objects at a first gaming terminal. Upon selection of a game-passing object at the first gaming terminal, the wagering game is passed to and displayed on a second gaming terminal. The wagering game is continued at the second gaming terminal.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
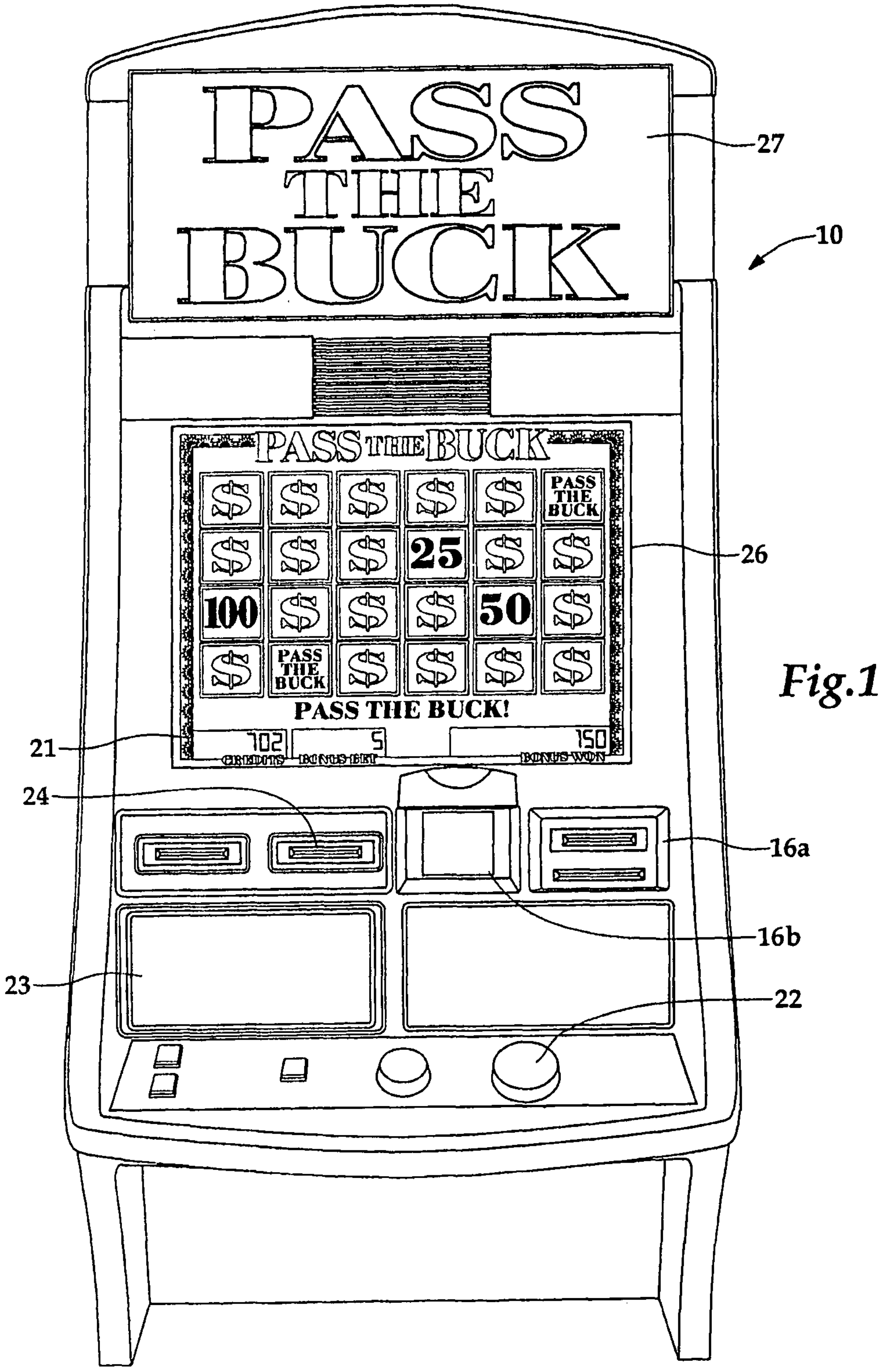
FIG. 1 is a perspective view of a video gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

The present invention is directed to a gaming terminal and a method of playing a wagering game at a gaming terminal whereby multiple players make selections and accumulate bonus awards as the game is passed from one player to another. Play continues until a game-terminating object is selected. At that time, each player that participated in the wagering game receives his or her accumulated awards plus any awards won by subsequent players.

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play video slots or a video casino game, such as blackjack, slots, keno, poker, etc.

As shown, the gaming terminal 10 includes input devices, such as a wager acceptor 16 (shown as a card wager acceptor 16*a* and a cash wager acceptor 16*b*), a touch screen 21, a push-button panel 22, and an information reader 24. For outputs, the gaming terminal 10 includes a payout mechanism 23, a main display 26 for displaying information about the basic wagering game, and a secondary display 27 that may display an electronic version of a pay table, a bonus game and/or also possibly game-related information or other entertainment features. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The cash wager acceptor 16*a* may include a coin slot acceptor or a note acceptor to input value to the gaming terminal 10. The card wager acceptor 16*b* may include a card-reading device for reading a card that has a recorded monetary value with which it is associated. The card wager acceptor 16*b* may also receive a card that authorizes access to a central account, which can transfer money to the gaming terminal 10.

Also included is the payout mechanism 23, which performs the reverse functions of the wager acceptor. For example, the payout mechanism 23 may include a coin dispenser or a note dispenser to output value from gaming terminal 10. Also, the payout mechanism 23 may also be adapted to receive a card that authorizes the gaming terminal to transfer credits from the gaming terminal 10 to a central account.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The outcome of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes the touch screen 21 overlaying the entire monitor (or a portion thereof) to allow players to make game-related selections. Alternatively, the gaming terminal 10 may have a number of mechanical reels to display the game outcome, as well.

In some embodiments, the information reader 24 is a card reader that allows for identification of a player by reading a card with information indicating his or her true identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10. The information reader 24 may also include a keypad (not shown) for entering a personal identification number (PIN). The gaming terminal 10 may require that the player enter their PIN prior to obtaining information. The gaming terminal 10 may use the secondary display 27 for providing the player with information about his or her account or other player-specific information. Also, in some embodiments, the information reader 24 may be used to restore assets that the player achieved during a previous game session and had saved.

Figure 2:
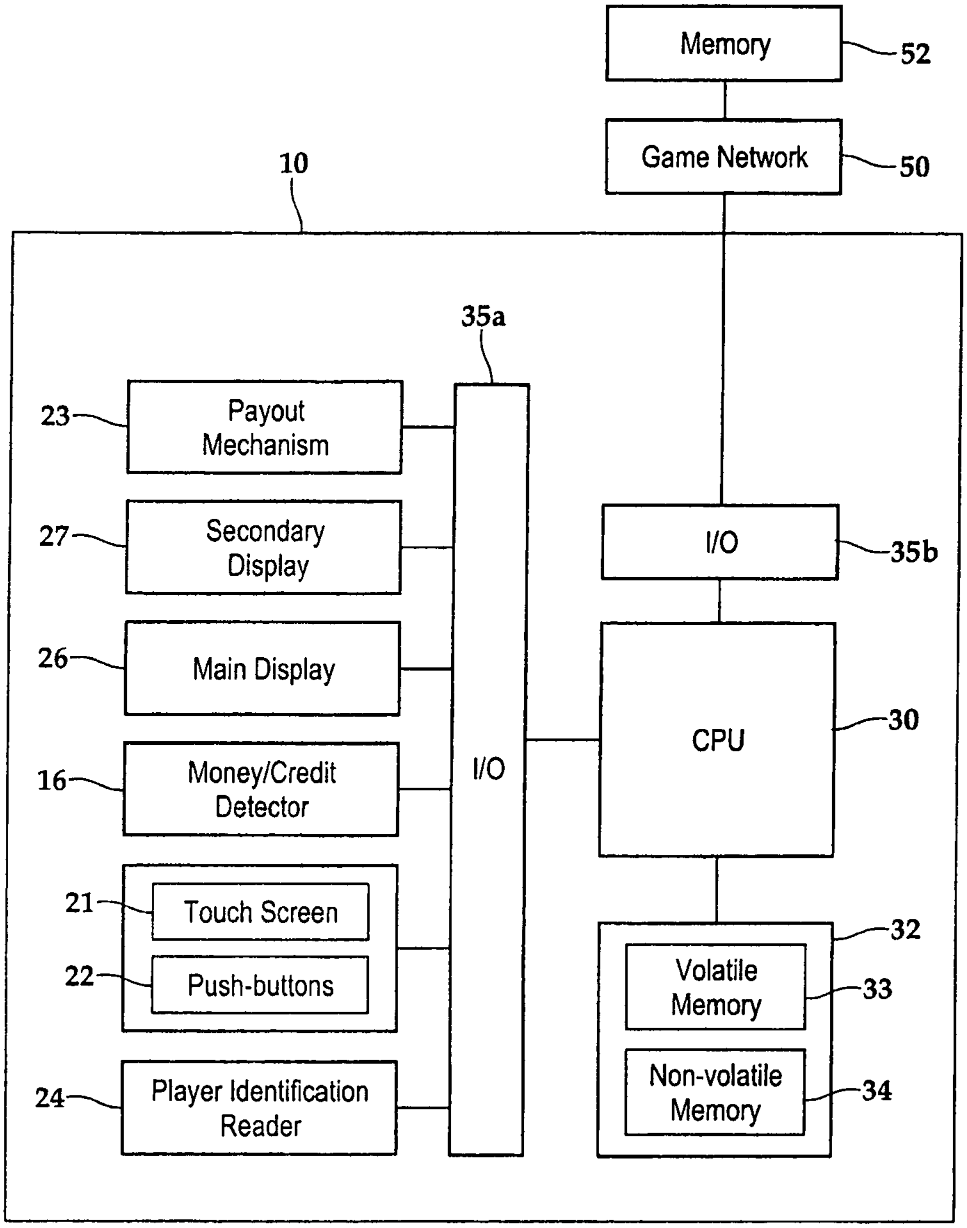
FIG. 2 is a block diagram of the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

It should be noted that the operation of the gaming terminal 10 can be controlled by a controller within the game network 50. As such, after receiving a wager at the gaming terminal 10, the random selection of the outcome occurs within the network 50. The network 50 then communicates the random outcome to the gaming terminal 10, which then displays symbols indicative of that outcome. In this alternative, the gaming terminal 10 is used for receiving inputs from the player and displaying outputs to the player. The game network 50 can be used to operate certain games, such as bonus games or progressive games that are contributed to by all or some of the gaming terminals 10 in the game network 50 (e.g., terminal-level jackpots that only each gaming terminal 10 contributes to, bank-level jackpots that are contributed to by all of the gaming terminals 10 in a particular bank, and wide-area jackpots that are contributed to by a larger number of gaming terminals 10, such as multiple banks). As described below, the game network 50 can be used to provide the selection of the gaming terminals 10 within the game network 50 that will be participating in the "Pass the Buck" bonus game. It can also be used for transferring information between or among gaming terminals 10 that are participating in the "Pass the Buck" bonus game.

In a preferred embodiment of the present invention, the wagering game includes a basic game and a bonus game. The basic game has a plurality of symbols that indicate a randomly selected outcome that is selected from a plurality of outcomes in response to a wager input by a player. One of the plurality of outcomes may be a bonus-game outcome that triggers a bonus game to be displayed. The bonus game may include selectable objects, some of which are associated with awards. The bonus awards may include credits, free spins, roll of a die, or other non-monetary awards.

Once a player achieves a bonus game, he or she is allowed to select selectable objects until either a game-passing object or a game-terminating object is selected. A player may select several objects associated with awards before either of these objects is selected. Alternatively, a player's first selection may be one of these objects. The player continues to accumulate awards based on his or her selections until a game-passing object or a game-terminating object is selected.

Once a game-passing object is selected, the bonus game is passed to a second player who continues to select objects in the same game. A player can become eligible to receive the bonus game via several different options. According to one embodiment, the player can "buy in" to the bonus game by opting to place a wager input either prior to or during play of the basic game. This "buy in" wager makes the player eligible to be passed the bonus game during a specified time period or number of spins. A player can also become eligible by simply playing the basic game at a time when the bonus game is being passed, i.e., no additional wager input is needed, and selection is randomly performed by a CPU 30. Alternatively, a player may be identified as being eligible to receive the bonus game based on predetermined criteria, such as having achieved a certain outcome or symbol combination on the reels in a specified prior number of spins, i.e., the last 10 spins. Further yet, a player may become eligible by playing in a mini-game tournament that is played at a plurality of gaming terminals, i.e., a bank of terminals. Once someone in the mini-game tournament triggers the bonus game, any player in the tournament may qualify to receive the bonus game. The order of qualification may be random or based on certain criteria, such as how long a player was playing at the gaming terminal before the bonus game was triggered, or how many "Pass the Buck" bonus points a person earned while playing. These embodiments are just a few of the possibilities for entering the bonus game, and are not meant to limit other ways of qualifying.

While the basic game may be the same or different at each gaming terminal 10, the bonus game that is passed from one gaming terminal to another is the same bonus game. This common bonus game shows each prior player's selections as it is passed form one gaming terminal 10 to another. Once passed, the second player continues to make selections in the bonus game and accumulate awards until he or she selects a game-passing object or a game-terminating object. If a game-passing object is selected, the bonus game is again passed to a third player. The third player continues making selections and accumulating awards associated with those selections. This series of selecting and passing continues until a game-terminating object is selected.

The eligibility of gaming terminals 10 to participate in the bonus game as it is passed from one gaming terminal 10 to another may depend on one or a number of factors. One factor may require that the gaming terminals 10 are adjacent to one another in a bank of gaming terminals. Another factor may require that a player has achieved a certain game outcome, i.e., a bonus-game-eligibility outcome, in the last 15 spins or 15 minutes before one of those players who has received the bonus-game-eligibility outcome hits a start-bonus-game outcome. With this factor, the order of eligibility of gaming terminals 10 may be based on those players who hit the bonus-game-eligibility outcome most recently. Another factor, similar to the previous factor, may require that only a fixed number of players at gaming terminals 10 are eligible based on which players most recently hit the bonus-game-eligibility outcome, i.e., the last 4. Another factor may require that a player is a member of a certain group that has been recognized by a player's ID card as being eligible to participate in the bonus game. This factor would be determined once the player inputs his or her ID card into the information reader 24, as shown in FIGS. 1 and 2.

In the preferred embodiment, once the game is terminated, each player receives the accumulated awards associated with the individual selections that he or she made while playing the game. Additionally, each player receives the accumulated awards of any subsequent selections made after the game was passed. For example, the first player who entered the bonus game receives all the awards associated with his or her selections plus all of the awards associated with the second, third and any subsequent player's selections. The second player who entered the bonus game after it was passed from the first player receives all of the awards associated with his or her selections plus all of the awards associated with the third and any subsequent player's selections. The third player who entered the bonus game after it was passed from the second player receives all of the awards associated with his or her selections plus any selections made by any subsequent players. These concepts are illustrated in more detail in FIGS. 3-8 as described below. These figures depict a wagering game entitled "Pass the Buck."

Figure 3:
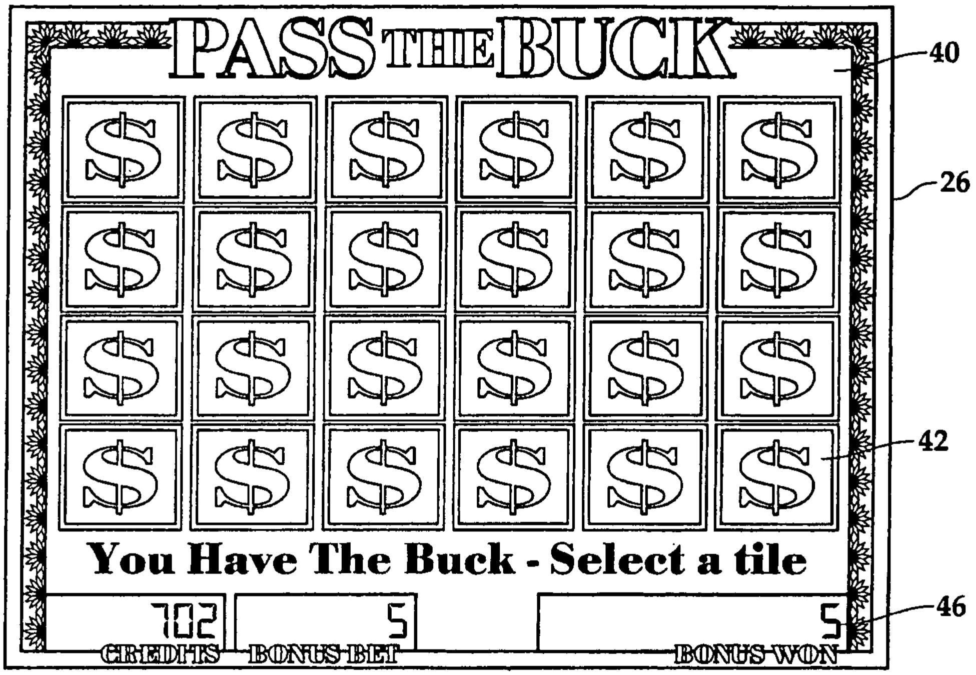
FIG. 3 illustrates a main display of the gaming terminal of FIG. 1 displaying a wagering game according to one embodiment of the present invention.

FIG. 3 depicts a bonus game 40 of the preferred embodiment displayed on a main display 26. Alternatively, the bonus game 40 may be displayed on a secondary display 27. The bonus game 40 is triggered when a player receives a combination of symbols that indicates a start-bonus-game outcome. The bonus game includes a 4×6 grid containing 24 selectable objects 42. The selectable objects 42 in FIG. 3 take the shape of a square tile with a dollar sign, but may be any type of selectable object. Other selectable objects can include people, animals, structures, articles, or any other object that can be presented in a wagering game.

Figure 4:
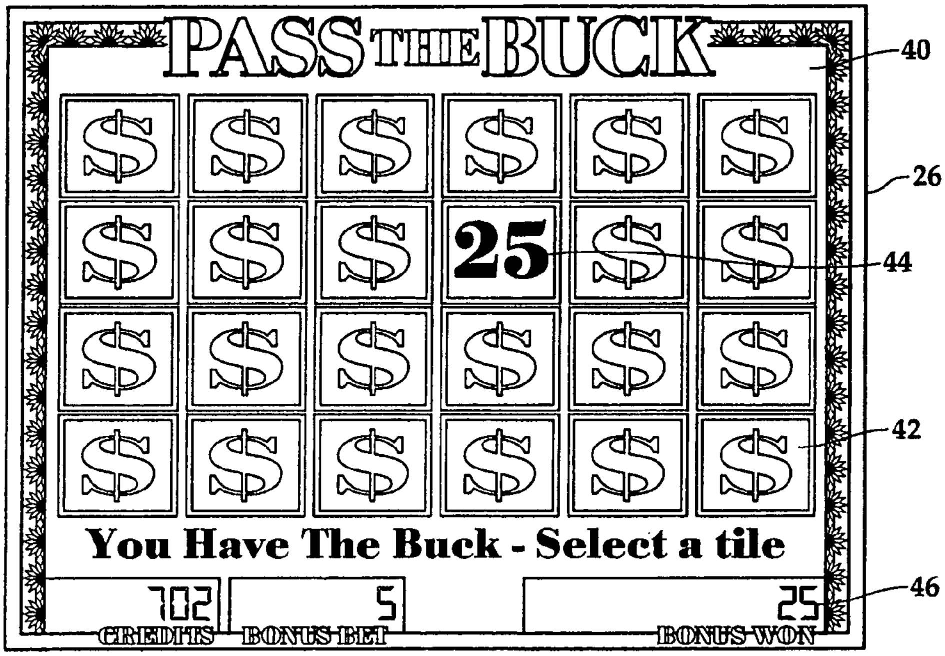
FIG. 4 illustrates a main display of a gaming terminal of FIG. 1 displaying a wagering game indicating a first player's selections according to one embodiment of the present invention.

In the bonus game in FIG. 3, a player is instructed to select a tile, i.e., "You Have The Buck—Select a Tile." Once selected, the award that is associated with the selected tile is displayed to the player. As shown in FIG. 4, an award of 25 credits is displayed at the location of the selected tile 44, and the award amount is indicated at the bonus indicator 46. The player is allowed to continue selecting tiles until a game-passing or game-terminating object is selected. The award amount in the bonus indicator 46 will continue to increase as bonus awards are selected.

Figure 5:
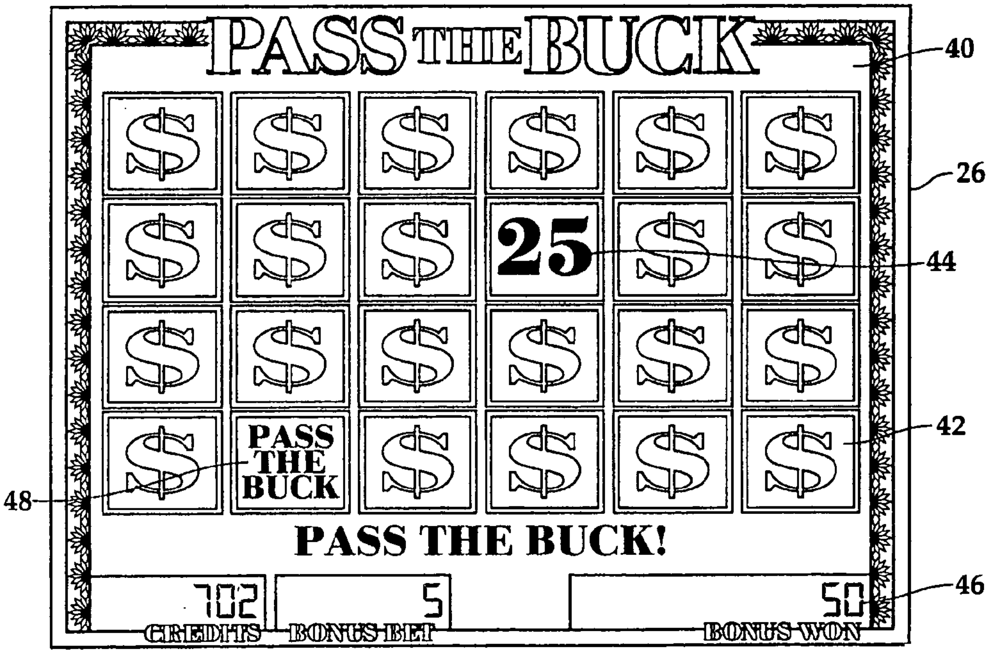
FIG. 5 illustrates a main display of a gaming terminal of FIG. 1 displaying a wagering game indicating a first player's selections, including a game-passing selection, according to one embodiment of the present invention.

The player chooses another tile as shown in FIG. 5. The selected tile reveals a game-passing object 48, i.e. "Pass the Buck." Upon selection of the game-passing object, the game is passed to a second gaming terminal 10. The second gaming terminal 10 can either be chosen by the player or by a random determination by the CPU 30 in the first gaming terminal. Or, a controller within the game network 50 can be used for the selection of the second gaming terminal 10 that will participate. Alternatively, the player's prior selections can also dictate where the game is passed. The gaming terminal 10 may include a meter that identifies which gaming terminals 10 are eligible to receive the bonus game once it is passed. The meter may show which gaming terminals 10 have achieved the bonus-game-eligibility outcome most recently and/or most often. The meter may be updated continuously as people continue to hit the eligibility award.

Figure 6:
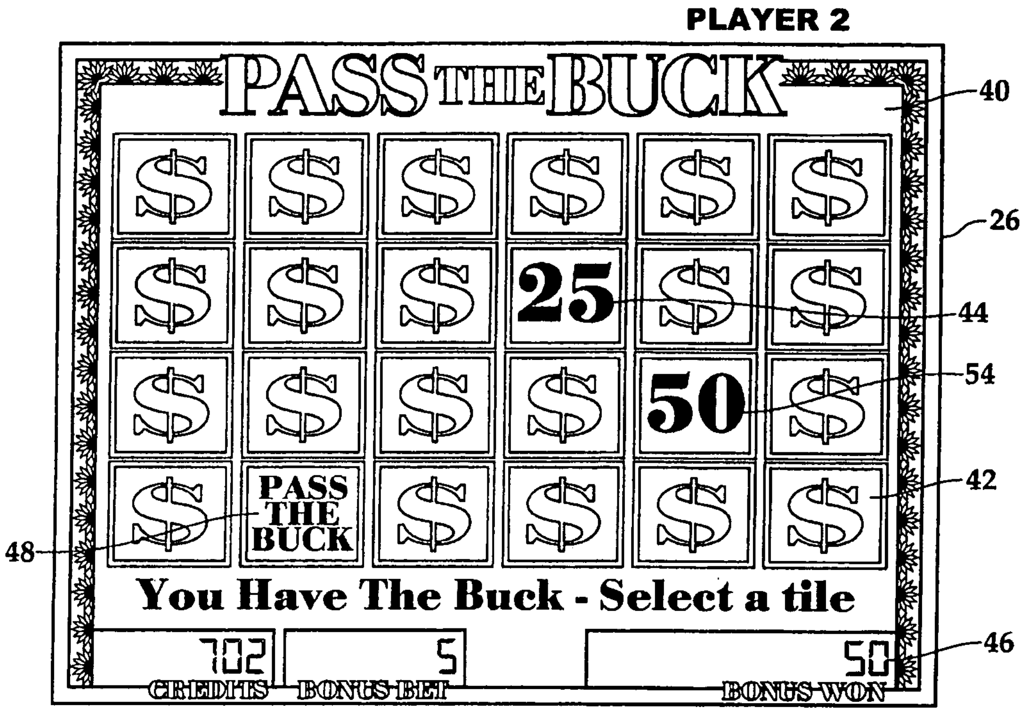
FIG. 6 illustrates a main display of a second gaming terminal of FIG. 1 displaying a wagering game indicating a first and second players' selections, according to one embodiment of the present invention.

FIG. 6 shows the main display 26 for the second gaming terminal 10 after the bonus game 40 has been passed to the second gaming terminal 10. The main display 26 at the second gaming terminal 10 displays the identical bonus game 40 as the main display 26 at the first gaming terminal 10. Thus, each of the players ("Player 1" and "Player 2") views the bonus game 40 at the same time as it is being played, or "real-time."

As shown in FIG. 6, the second player ("Player 2") is allowed to continue to make selections from the same bonus game 40. The tiles that were selected by the first player are no longer eligible for selection by subsequent players. The second player can select any of the other tiles not selected by the first player. As shown in FIG. 6, the second player selects a tile 54 that is associated with an award of 50 credits. At this point, the award amount, i.e. "50," is indicated in the bonus indicator 46 at the second gaming terminal 10.

Figure 7:
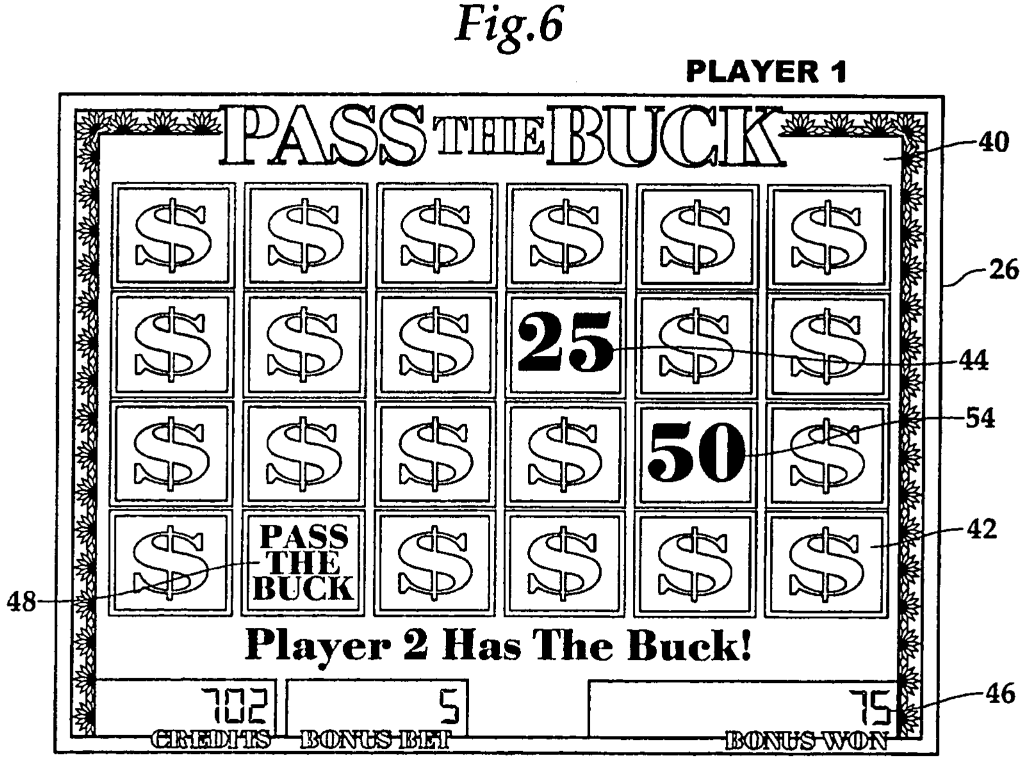
FIG. 7 illustrates a main display of a first gaming terminal of FIG. 1 displaying a wagering game indicating a first and second players' selections, according to one embodiment of the present invention.

As shown in FIG. 7 and described above, after the game has been passed to the second player, the main display 26 at the first gaming terminal 10 (indicated as "Player 1") displays the bonus game 40 with the selections of the first player (44, 48) and the second player (54). Furthermore, the award associated with the second player's selection is now included in the bonus indicator 46. For example, as shown in FIG. 7, the bonus indicator 46 at the first gaming terminal now has a bonus award of 75 credits. Thus, the first player receives the bonus awards associated with his or her selections and any subsequent bonus awards that are associated with selected objects after the game is passed.

Figure 8:
FIG. 8 illustrates a main display of a second gaming terminal of FIG. 1 displaying a wagering game indicating a first and second players' selections, including a game-passing selection, according to one embodiment of the present invention.
Figure 9:
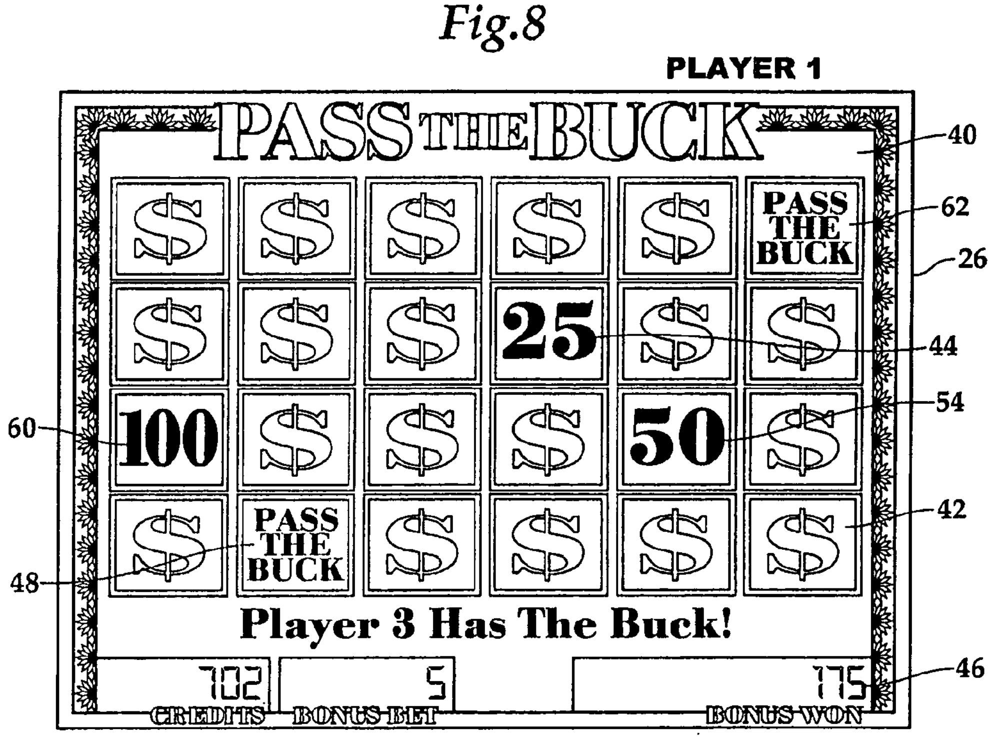
FIG. 9 illustrates a main display of a first gaming terminal of FIG. 1 displaying a wagering game indicating a first and second players' selections, including a game-passing selection, according to one embodiment of the present invention.

The bonus game continues until the second player selects a game-passing object or a game-terminating object. As shown in FIGS. 8 and 9, the second player has selected a tile 60 with an award of "100," and thus 100 credits are added to the bonus indicator 46 at the first and second gaming terminals such that the awards are now 175 and 150 credits, respectively. The player at the gaming terminal 10 has then selected a game-passing object 62 that stops the selections of the second player and passes the game to a third player.

Figure 10:
FIG. 10 illustrates a main display of a third gaming terminal of FIG. 1 displaying a wagering game indicating a first, second and third players' selections, including a game-terminating selection, according to one embodiment of the present invention.
Figure 11:
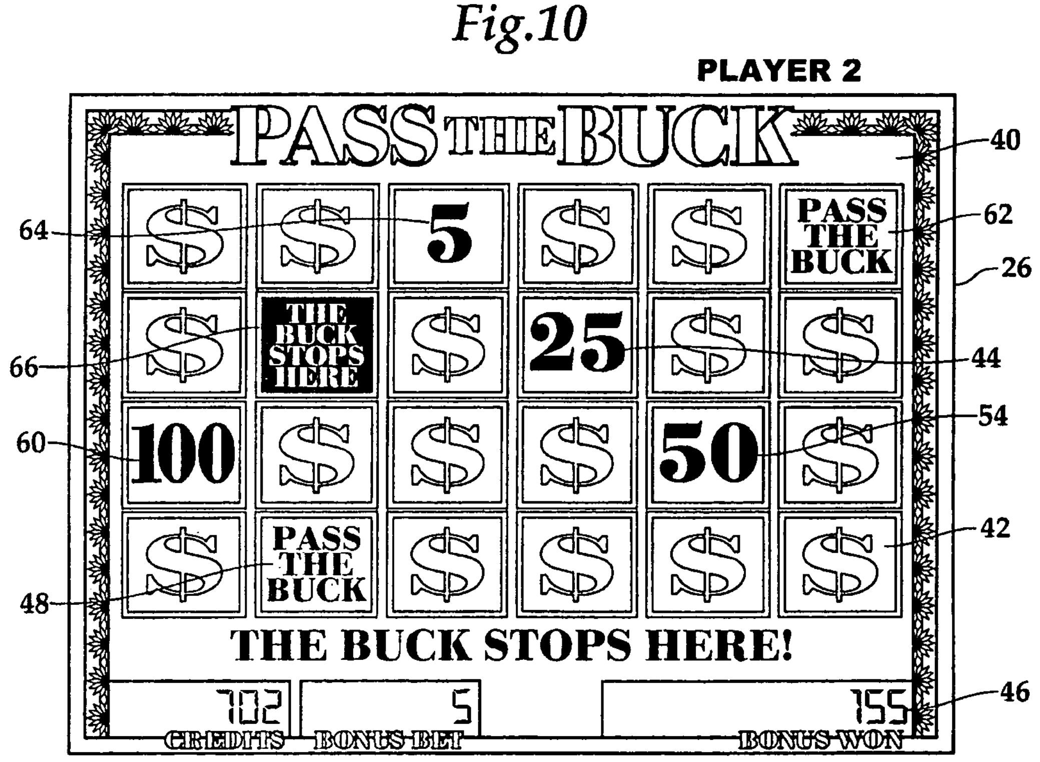
FIG. 11 illustrates a main display of a second gaming terminal of FIG. 1 displaying a wagering game indicating a first, second and third players' selections, including a game-terminating selection, according to one embodiment of the present invention.
Figure 12:
FIG. 12 illustrates a main display of a fist gaming terminal of FIG. 1 displaying a wagering game indicating a first, second and third players' selections, including a game-terminating selection, according to one embodiment of the present invention.

FIGS. 10, 11 and 12 illustrate the main displays 26 displaying the bonus game 40 at a first, second and third gaming terminals. The third player ("Player 3"), in FIG. 10, is allowed to make selections until a game-passing object or game-terminating object is selected. After having selected a tile 64 associated with an award of "5," each of the players is awarded 5 credits as shown in the bonus indicators 46. Thus, the bonus indicator 46 of the third gaming terminal 10 (shown in FIG. 10) has 5 credits; the bonus indicator 46 of the second gaming terminal 10 (shown in FIG. 11) has 155 credits; and the bonus indicator 46 of the first gaming terminal 10 (shown in FIG. 12) has 180 credits.

As shown in FIGS. 10-12, the third player has next selected a tile 66 that terminates game play, i.e. "The Buck Stops Here." The bonus game 40 is then ended, and each participating player receives his or her accumulated bonus award plus the accumulated award of subsequent players, as indicated in the respective bonus indicators 46.

The size of the grid of player-selectable objects may be adjusted to reflect the number of players that are at participating gaming terminals. For example, as more players are available to participate in the bonus game, the grid may expand to have a grid that is larger than 4×6. Alternatively, the grid may be made smaller if less players are available to participate in the bonus game. Accordingly, the number of bonus awards, game-passing objects and game-terminating objects will be adjusted to reflect the larger or smaller grid size.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A computer-implemented method of playing a wagering game on a wagering game system connected for communication to a first wagering game terminal and a second wagering game terminal, the wagering game system including one or more input devices, one or more display devices, and one or more processors, the method comprising:

receiving, via at least one of the one or more input devices, an input indicative of a wager initiating the wagering game on the first wagering game terminal;

displaying a set of selectable elements, on at least one of the one or more display devices, to a first player playing at the first wagering game terminal, and displaying the same set of selectable elements, on at least one of the one or more display devices, to a second player playing at the second wagering game terminal;

in direct response to an occurrence of a game-feature triggering event during play of the wagering game, receiving, via at least one of the one or more input devices, at least a first selection from the first player at the first wagering game terminal, revealing an outcome associated with the first selection after receiving the first selection, and receiving, via at least one of the one or more input devices and after revealing the outcome associated with the first selection, a second selection from the second player at the second wagering game terminal, the first and second selections each being a selection of at least one of the displayed set of selectable elements;

awarding, via at least one of the one or more processors, an award to the first player based on at least the first selection; and awarding, via at least one of the one or more processors, an award to the second player based on at least the second selection.

2. The method of claim 1, further comprising making the first selection unavailable for selecting by the second player after receiving the first selection.

3. The method of claim 1, further comprising awarding an award to the first player corresponding to an award or awards associated with the second selection.

4. The method of claim 1, further comprising terminating the first selection following a selection by the first player of a selectable element associated with a selection-ending outcome.

5. The method of claim 4, further comprising enabling the second selection by the second player at the second wagering game terminal only subsequent to terminating the first selection.

6. The method of claim 5, further comprising terminating the second selection following a selection by the second player of a selectable element associated with a selection-ending outcome.

7. The method of claim 1, wherein awarding an award to the first player comprises awarding an award corresponding to both the first selection and the second selection.

8. The method of claim 1, wherein the wagering game system is further connected to a third wagering game terminal, and wherein the method further comprises, in direct response to the occurrence of the game-triggering event, receiving a third selection of at least one of the set of selectable elements from a third player at the third wagering game terminal.

9. The method of claim 8, further comprising awarding an award to the first player corresponding to an award or awards associated with the second selection and to an award or awards associated with the third selection.

10. The method of claim 9, further comprising awarding an award to the second player corresponding to an award or awards associated with the third selection.

11. A gaming system for playing a wagering game, the gaming system comprising:

one or more input devices;

one or more display devices;

one or more processors; and one or more memory devices storing instructions that, when executed by at least one of the one or more processors, cause the gaming system to operate with a first and second wagering game terminal to:

receive, via at least one of the one or more input devices, an input indicative of a wager initiating the wagering game on the first wagering game terminal;

display a set of selectable elements, on at least one of the one or more display devices, to a first player playing at the first wagering game terminal, and display the same set of selectable elements, on at least one of the one or more display devices, to a second player playing at the second wagering game terminal;

in direct response to an occurrence of a game-feature triggering event during play of the wagering game, receive, via at least one of the one or more input devices, a first selection from the first player at the first wagering game terminal, reveal an outcome associated with the first selection after receiving the first selection, and receive, via at least one of the one or more input devices and after revealing the outcome associated with the first selection, a second selection from the second player at the second wagering game terminal, the first and second selections each being a selection of at least one of the displayed set of selectable elements;

award an award to the first player based on at least the first selection; and award an award to the second player based on at least the second selection.

12. The gaming system of claim 11, wherein each element of the set of selectable elements is associated with a specific outcome.

13. The gaming system of claim 11, wherein the instructions further cause the gaming system to make the first selection unavailable for selecting by the second player after receiving the first selection.

14. The gaming system of claim 11, wherein the instructions further cause the gaming system to enable the second selection by the second player at the second wagering game terminal only subsequent to terminating the first selection.

15. The gaming system of claim 11, wherein the instructions further cause the gaming system to award an award to the first player corresponding to both the first player's selection of said at least one of the selectable elements and the second player's selection of said at least one of the selectable elements.

16. The gaming system of claim 15, further comprising:

a network interface connecting the one or more display devices, the one or more processors, and the first and second wagering game terminals, for communication across a communications network.

17. The gaming system according to claim 16, wherein the game-triggering event is part of the wagering game.

* * * * *